Feb. 2, 1932  J. MANGIN  1,843,826

GROUNDING NUT

Filed Aug. 4, 1930

Inventor:
James Mangin
By his Attorneys
Howson & Howson

Patented Feb. 2, 1932

1,843,826

UNITED STATES PATENT OFFICE

JAMES MANGIN, OF NEW BRUNSWICK, NEW JERSEY

GROUNDING NUT

Application filed August 4, 1930. Serial No. 472,995.

The present invention relates to devices for mechanically and electrically connecting conductor-carrying conduits or pipes to the walls of outlet boxes, and has for a general object the provision of improved means for connecting a conductor-carrying conduit or pipe to an outlet box.

A further and more specific object of the invention is to provide a novel grounding nut for mechanically and electrically connecting a conductor-carrying pipe to the side wall of an outlet box.

An important feature of the invention is the provision of a grounding nut having an extended thread which lies between the threaded portion of the conduit or pipe and the wall of the outlet box, and is adapted to be forced against the wall of the box due to the taper of the pipe threads.

Another important feature of the invention is the provision of a grounding nut having a plurality of angularly-extending threaded holes in its peripheral portion, any one of which is adapted to receive a threaded screw which has a pointed or cupped end and bites into the wall of the box to provide a better electrical connection between the pipe and the box. This screw also causes the extended thread of the grounding nut mentioned above to be more securely wedged between the pipe and the box.

An additional feature of the invention is the fact that a terminal lug for a jumper wire may if desired be firmly secured and connected to the grounding nut by simply providing a lock-nut on the angularly-extending screw.

Another feature of the invention is the provision of an improved lock-washer which may be used in conjunction with the grounding nut, and which has recessed corners to facilitate tightening of the same by means of a screw driver or like instrument.

The above and other objects of my invention, as well as the details of construction of a preferred embodiment thereof, may be more clearly understood from the following detailed description in connection with the accompanying drawings.

Figure 1:
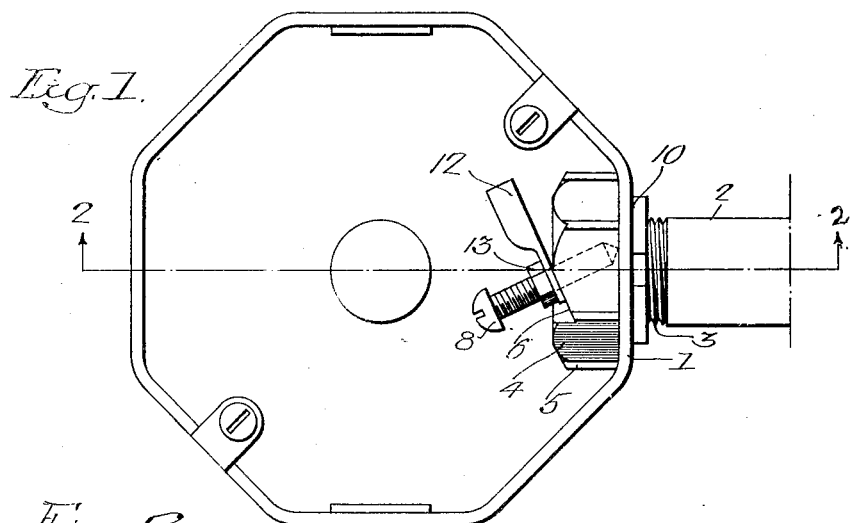
Fig. 1 is a plan view of the usual outlet box having a conductor-carrying pipe attached thereto by means of my improved grounding nut and lock-washer, only one such connection being shown for the sake of simplicity.
Figure 2:
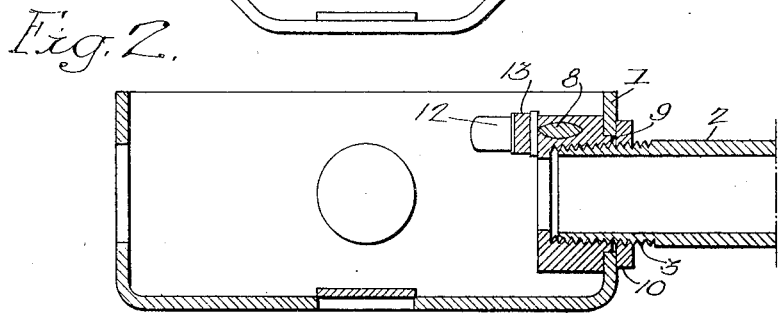
Fig. 2 is a sectional view of the structure of Fig. 1 taken along line 2—2 of Fig. 1.
Figure 3:
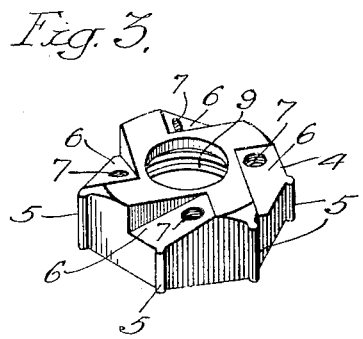
Fig. 3 is a perspective view of my improved grounding nut.
Figure 4:
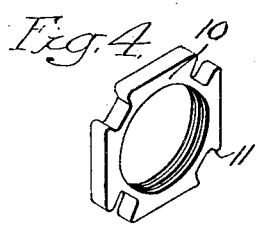
Fig. 4 is a perspective view of my improved lock-washer which may be used in conjunction with the grounding nut.

Referring to the various figures of the drawings, there is shown an outlet box of usual form having a side wall 1 with apertures spaced thereabout to receive conductor-carrying conduits or pipes, as is well known. A conductor-carrying pipe 2 has its end portion threaded as at 3 and is attached to the wall of the box by means of grounding nut 4. It will be understood that any number of pipes similar to the one shown may be attached to the outlet box, only one being shown in the present instance for the sake of simplicity. The grounding nut 4 preferably takes the form of a hex-nut, although it may take any other desired form. It is provided along its corner edges with raised rounded portions 5, so that it may be tightened by placing a screw driver or like instrument against these portions and tapping the same with a hammer, as is well known. The nut, then, lends itself to two manners of tightening the same, viz, by means of a wrench or by tapping a screw driver, either or both of which may be used to tighten the nut.

The grounding nut also has a plurality of cut-away portions about its top peripheral portion to provide angularly-extending surfaces 6. In the present instance, four such surfaces are equally spaced about the peripheral portion of the nut, although, it will be apparent that as many as is desired may be used. A plurality of angularly-extending threaded holes 7 are provided in the cut-away portions of the nut, and extend perpendicularly to surfaces 6 through the outer portion of the nut. Any one of these holes is adapted to receive a screw 8, which may be either pointed or cup-shaped at its end to provide a sharp instrumentality for biting into wall 1 of the box. I prefer to make the screw cup-shaped on its end. The grounding nut has an extended thread 9 which, when the nut is in position, extends or lies between the edges of the opening in wall 1 and the threaded portion of pipe 2. As is customary, I provide a lock-nut 10 on the opposite side of the box wall to more rigidly connect the pipe to the box. However, the lock-nut of my device is provided at its corner portions with recesses 11 to facilitate tightening of the same. This nut may be readily tightened by means of a screw driver or like instrument placed in the recesses and tapped with a hammer. It may also, of course, be tightened by means of a wrench.

As will be readily understood from the showing of the drawings, the conductor-carrying pipe may be readily connected to the outlet box by threading the lock-nut on the end of the pipe, inserting the end of the pipe through the opening in the box wall, and threading the grounding nut upon the end of the pipe as shown. After the pipe has been threadedly extended within the grounding nut as far as is possible, the lock-nut may be tightened against the outside of the box wall to more rigidly attach the pipe to the box. At this time, there will be at least one of the threaded openings 7 which will be easily accessible. Naturally, the greater the number of threaded openings in the grounding nut, the more accessible at least one of them will be after the nut is tightened. The screw is then extended through the accessible opening until it bites into the wall of the box. During the assembly of the device, the extended thread 9 of the grounding nut will be firmly wedged between the pipe and the wall of the box due to the taper of the threads on pipe 2 and also due to the biting action of screw 8. It will be readily apparent that the taper of the pipe threads will force the extended thread of the grounding nut against the edge of the box wall, since the threads of the pipe gradually become of greater diameter toward its inner portion. The biting action of the screw also has a tendency to slightly displace the grounding nut, thereby causing a greater wedging action of the extended thread over a considerable portion of its surface.

As will be obvious to those skilled in the art, my improved grounding nut provides a device for forming an excellent electrical connection between the outlet box and the pipe.

Due to the taper of the pipe threads and the biting action of the screw, as explained above, the extended thread of the grounding nut will in all cases form an efficient contact medium between the pipe and the wall of the outlet box, and the biting of the screw into the box will also provide excellent contact between the box and the grounding nut. Furthermore, it will be readily perceived that my device is simple in construction and is easily assembled. In practice, of course, more than one conductor-carrying pipe would be connected to the box, and by using my improved grounding nut to electrically connect each pipe to the box, a continuous grounding conductor which includes the various pipes and the outlet box is provided. While, normally, with the use of my invention, it would be unnecessary to use jumper wires to electrically connect one pipe to another within the outlet box, my grounding nut and its associated angularly-extending screw readily lends itself to the use of such jumper wires. As shown on the drawings, it is merely necessary to provide a lock-nut 13 on the screw to hold the terminal lug 12 of a jumper wire firmly against the surface 6 of the grounding nut. Obviously, the grounding nut to which the other end of the jumper wire is to be connected will be provided with a similar lock washer to securely hold the conductor terminal.

While I have shown a single preferred embodiment of my invention, it will be readily apparent to those skilled in the art that various changes and modifications in the details of construction may be made without departing from the spirit of my invention. It is to be understood, therefore, that the present disclosure is for the purpose of illustration only and is not to be taken as limiting my invention in any way. The invention is to be limited only as is required by the prior art, as indicated by the scope of the appended claims.

I claim:

1. The combination with a box having an opening through its wall, of a grounding nut surrounding said opening on one side of said wall and adapted to threadedly receive a pipe, said nut having a relatively thin threaded extension projecting into said opening, whereby the normal taper of the pipe threads wedges said extension against the edge of said wall.

2. The combination with a box having an opening through its wall, of a grounding nut surrounding said opening on one side of said wall and adapted to threadedly receive a pipe, said nut having a relatively thin threaded extension projecting into said opening, whereby the normal taper of the pipe threads wedges said extension against the edge of said wall, and a lock-nut threaded on said pipe on the other side of said wall.

3. The combination with a box having an opening through its wall, of a grounding nut surrounding said opening on one side of said wall and adapted to threadedly receive a pipe, said nut having a relatively thin extension projecting into said opening, and at least one screw extending through the outer portion of said nut and adapted to bite into said wall, whereby the biting action of said screw wedges said extension against the edge of said wall.

4. The combination with a box having an opening through its wall, of a grounding nut surrounding said opening on one side of said wall and adapted to threadedly receive a pipe, said nut having a relatively thin threaded extension projecting into said opening, and at least one screw extending through the outer portion of said nut and adapted to bite into said wall, whereby the normal taper of the pipe threads and the biting action of said screw wedges said extension against the edge of said wall.

5. The combination with a box having an opening through its wall, of a grounding nut surrounding said opening on one side of said wall and adapted to threadedly receive a pipe, said nut having a relatively thin extension projecting into said opening, and at least one screw extending through the outer portion of said nut and adapted to bite into said wall, whereby the biting action of said screw wedges said extension against the edge of said wall, and a lock-nut threaded on said pipe on the other side of said wall.

6. The combination with a box having an opening through its wall, of a grounding nut surrounding said opening on one side of said wall and adapted to threadedly receive a pipe, said nut having an extended threaded portion projecting into said opening, at least one screw extending through the outer portion of said nut and adapted to bite into said wall, whereby the normal taper of the pipe threads and the biting action of said screw wedges said extension against the edge of said wall, and a lock-nut threaded on said pipe on the other side of said wall.

JAMES MANGIN.